(12) United States Patent
Mastie et al.

(10) Patent No.: US 9,463,691 B1
(45) Date of Patent: *Oct. 11, 2016

(54) ELECTRONIC SHIFT ON THE FLY PART-TIME ELECTRO MECHANICAL TRANSFER CASE

(71) Applicant: BorgWarner Inc., Auburn Hills, MI (US)

(72) Inventors: Joseph D. Mastie, Belleville, MI (US); Larry A. Pritchard, Macomb, MI (US); Mallikarjun Rudagi, Auburn Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/990,897

(22) Filed: Jan. 8, 2016

(51) Int. Cl.
| F16H 37/08 | (2006.01) |
| B60K 23/08 | (2006.01) |
| B60K 17/344 | (2006.01) |
| F16H 3/085 | (2006.01) |
| F16H 37/06 | (2006.01) |
| F16H 63/04 | (2006.01) |
| F16H 61/32 | (2006.01) |

(52) U.S. Cl.
CPC ............ B60K 23/08 (2013.01); B60K 17/344 (2013.01); F16H 3/085 (2013.01); F16H 37/065 (2013.01); F16H 61/32 (2013.01); F16H 63/04 (2013.01); B60K 2023/0858 (2013.01)

(58) Field of Classification Search
CPC .................. B60K 23/0808; B60K 2023/0875; B60K 17/342; F16H 37/08; F16H 37/0813; F16H 37/082; F16H 37/065
See application file for complete search history.

(56) References Cited

U.S. PATENT DOCUMENTS

| 5,916,051 | A | * | 6/1999 | Schleuder | ............ | B60K 17/344 475/138 |
| 7,988,590 | B2 | | 8/2011 | Jordan et al. | | |
| 8,023,200 | B2 | | 9/2011 | Kuwahara et al. | | |
| 8,289,626 | B2 | | 10/2012 | Nomura | | |
| 8,402,859 | B2 | | 3/2013 | Neelakantan et al. | | |
| 8,739,417 | B2 | | 6/2014 | Tokunaga et al. | | |
| 9,186,987 | B2 | | 11/2015 | Mastie et al. | | |
| 2004/0188213 | A1 | * | 9/2004 | Pennycuff | .......... | B60K 17/3462 192/35 |
| 2015/0158383 | A1 | * | 6/2015 | Mastie | ............... | B60K 17/3467 475/204 |
| 2015/0159751 | A1 | * | 6/2015 | Pritchard | ........... | B60K 17/3467 475/150 |

OTHER PUBLICATIONS

U.S. Appl. No. 14/828,838 ; First named Inventor: Larry A. Pritchard; Title: Electronic Shift on the Fly Part-Time Electro Mechanical Transfer Case ; filed Aug. 18, 2015.

* cited by examiner

*Primary Examiner* — Huan Le
(74) *Attorney, Agent, or Firm* — BrooksGroup (57) ABSTRACT

A number of variations may include a transfer case comprising an input shaft and a first output shaft sharing a primary axis of rotation; a second output shaft offset from the first output shaft; a range shifter comprising a first cam constructed and arranged to selectively shift a vehicle to a high-range drive mode, a low range drive mode, or a neutral drive mode; a mode shifter comprising a second cam constructed and arranged to actuate a synchronizer which selectively shifts the vehicle between a two-wheel drive mode and a four-wheel drive mode a gear train having a first axis offset from the primary axis, and a reversible electric motor which drives the gear train wherein direction of the rotation of the electric motor determines engagement or disengagement of the mode shifter to selectively shift the vehicle between the two-wheel drive mode and the four-wheel drive mode.

20 Claims, 8 Drawing Sheets

ELECTRONIC SHIFT ON THE FLY PART-TIME ELECTRO MECHANICAL TRANSFER CASE

TECHNICAL FIELD

The field to which the disclosure generally relates to includes transfer cases.

BACKGROUND

A vehicle may include an electronic shift on the fly transfer case which may allow for the selective engagement of a four-wheel-drive mode or a two-wheel-drive mode.

SUMMARY OF ILLUSTRATIVE VARIATIONS

A number of variations may include a transfer case comprising: an input shaft having a primary axis of rotation; a first output shaft which is concentric with the input shaft; a second output shaft offset from the first output shaft; a range shifter comprising a first cam rotatable about the primary axis constructed and arranged to selectively shift a vehicle to a high-range drive mode, a low range drive mode, or a neutral drive mode; a mode shifter comprising a second cam rotatable about the primary axis constructed and arranged to actuate a synchronizer which selectively shifts the vehicle between a two-wheel drive and a four-wheel drive mode; a dual drive gear interposed between the range shifter and the mode shifter, wherein a first side of the dual drive gear includes an actuating tab constructed and arranged to actuate the first cam and wherein the second cam is attached to a second side of the dual drive gear so that the mode shifter is activated by rotation of the dual drive gear; a gear train operatively connected to the dual drive gear to drive the dual gear drive, wherein the gear train has a first axis offset from the primary axis; and a reversible electric motor which drives the gear train wherein direction of the rotation of the electric motor determines engagement or disengagement of the mode shifter to selectively shift the vehicle between a two-wheel drive and a four-wheel drive mode.

A number of variations may include a transfer case comprising: an input shaft having a primary axis of rotation; a first output shaft which is concentric with the input shaft; a second output shaft offset from the first output shaft; a range shifter comprising a first cam, a first shift fork, wherein the first shift fork is driven axially by the first cam, and a first sleeve which is axially driven by the first shift fork; a mode shifter comprising a second cam, a second shift fork, wherein the second shift fork is driven axially by the second cam, and a synchronizer, wherein the synchronizer is actuated by the second shift fork through rotation of the second cam; a dual drive gear, wherein the dual drive gear is rotated in a forward and a reverse direction to actuate the range shifter and the mode shifter, a gear train operatively connected to the dual drive gear to drive the dual gear drive; and a reversible electric motor which drives the gear train wherein direction of the rotation of the electric motor determines engagement or disengagement of the mode shifter to selectively shift the vehicle between a two-wheel drive and a four-wheel drive mode.

A number of variations may include a method for assembling a transfer case comprising: providing an input shaft and a first output shaft coaxially on a primary axis of rotation; providing a second output shaft offset from the first output shaft; providing a power transmission device interposed between the first output shaft and the second output shaft; providing a range shifter operatively attached to the first output shaft comprising a first cam constructed and arranged for shifting between a low-range drive mode, a high-range drive mode, and a neutral drive mode; providing a mode shifter for shift-on-the-fly comprising a second cam operatively attached to a synchronizer constructed and arranged for shifting between a two-wheel drive mode and a four-wheel drive mode; providing a dual drive gear between the range shifter and the mode shifter constructed and arranged so that rotation of the dual drive gear actuates the range shifter and the mode shifter; providing a gear train off axis from the primary axis constructed and arranged to drive the dual drive gear in a clockwise and counter clockwise direction; and providing a reversible electric motor which drives the gear train wherein direction of the rotation of the electric motor determines engagement or disengagement of the mode shifter to selectively shift the vehicle between a two-wheel drive and a four-wheel drive mode.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
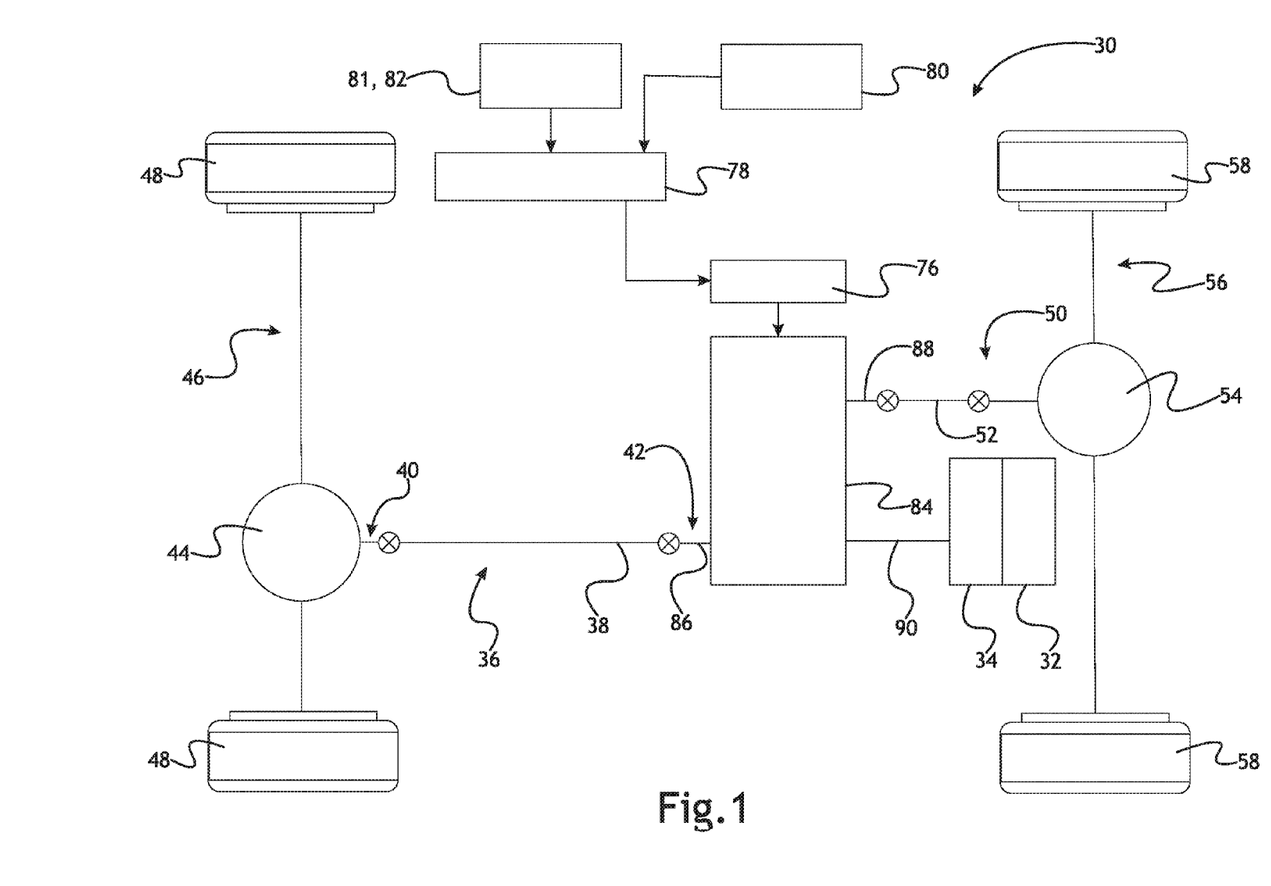
FIG. 1 illustrates a schematic of a vehicle including a transfer case according to a number of variations.

Referring to FIG. 1, in a number of variations, a vehicle 30 may include an engine 32, including, but not limited to, an internal combustion engine which may be operatively connected to a power transmission device 34 which may be operatively connected to a rear driveline 36 and a front driveline 50. In a number of variations, the power transmission device 34 may generate and deliver torque from the engine 32 to the rear driveline 36 and the front driveline 50. In a number of variations, the rear driveline 36 may include a rear drive shaft 38. In a number of variations, a first end 40 of the rear drive shaft 38 may be operatively connected to a rear differential 44, which may be operatively connected to a rear axle 46. In a number of variations, a pair of rear wheels 48 may be attached to opposing ends of the rear axle 46. In a number of variations, a second end 42 of the rear drive shaft 38 may be operatively connected to and may be driven by a first output shaft 86 of an transfer case 84. In a number of variations, the transfer case may be an electro mechanical transfer case (EMTC). In a number of variations, the EMTC 84 may be operatively connected to an input shaft 90 which may be operatively connected to the power transmission device 34. In a number of variations, the EMTC 84 may be used to selectively engage a four-wheel drive mode or and two-wheel drive mode of the vehicle 30 as well as to selectively put the vehicle 30 into a high or low range mode. In a number of variations, the EMTC 84 may be operatively attached to a reversible electric motor 76. In a number of variations, the EMTC 84 may also include a second output shaft 88 which may be operatively connected to the front driveline 50. In a number of variations, the front driveline 50 may include a front drive shaft 52 which may be operatively connected to the second output shaft 88 of the EMTC 84 and may be driven by the second output shaft 88. In a number of variations, the front driveline 50 may also include a front differential 54 which may be operatively connected to the front drive shaft 52 and a front axle 56. In a number of variations, a pair of front wheels 58 may be attached to opposing ends of the front axle 56.

Figure 2:
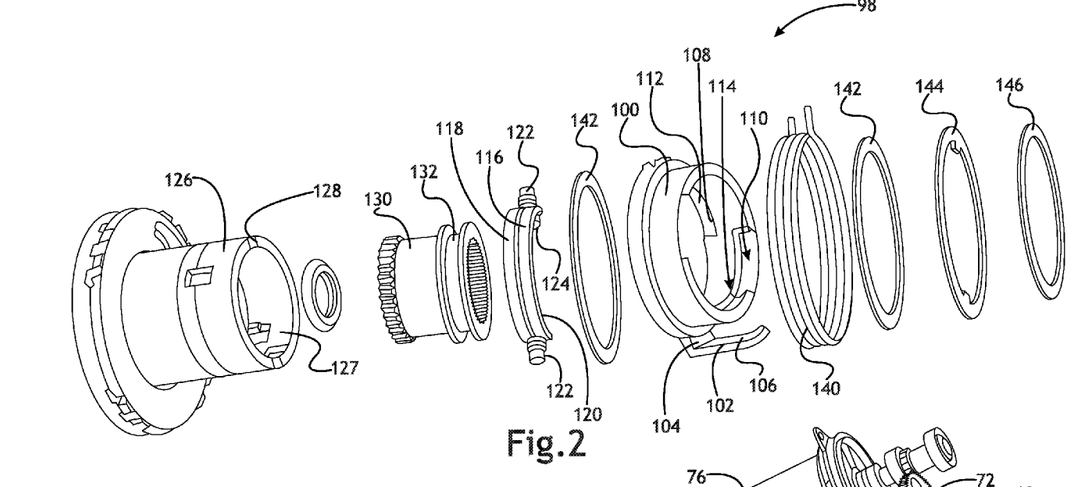
FIG. 2 illustrates an exploded view of a range shifter according to a number of variations.
Figure 3:
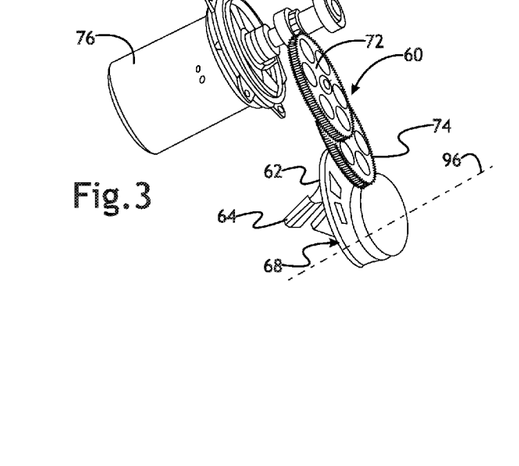
FIG. 3 illustrates a perspective view of an electric motor and a gear train according to a number of variations.
Figure 4:
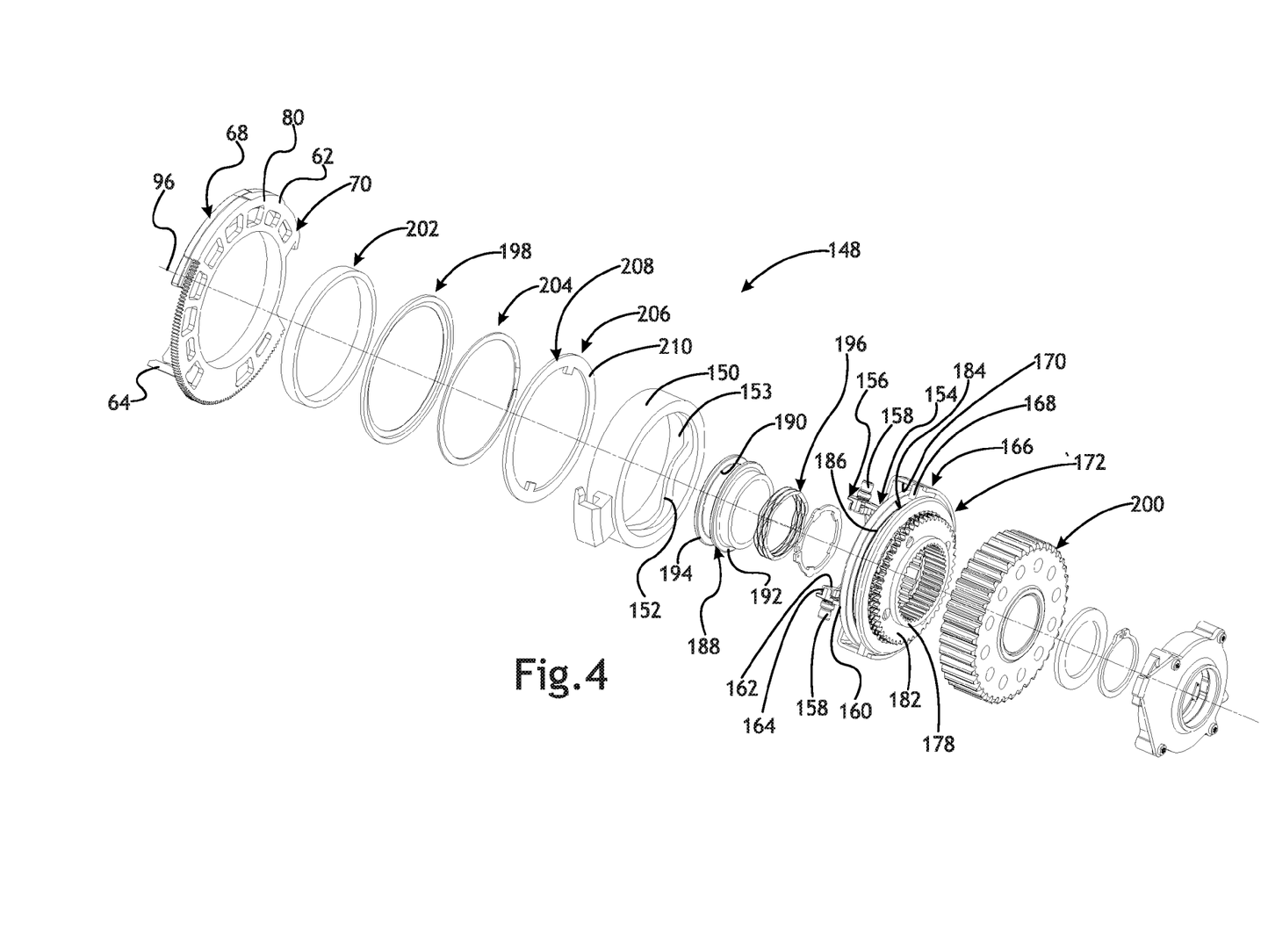
FIG. 4 illustrates an exploded view of a mode shifter according to a number of variations.
Figure 5:
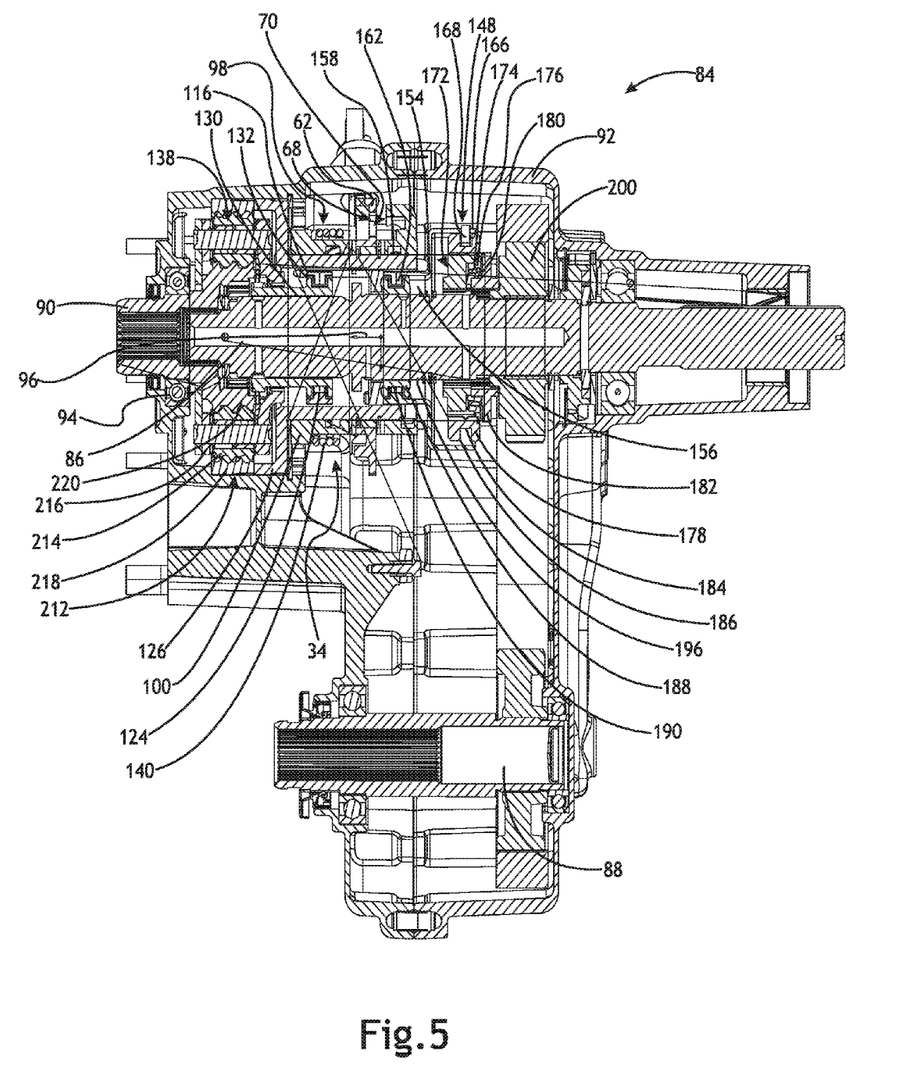
FIG. 5 illustrates an expounded view of a transfer case according to a number of variations.

FIGS. 1-5 illustrate a number of variations. In a number of variations, the EMTC 84 may include a range shifter 98 which may be used to shift the vehicle 30 to a low-range drive mode, a high-range drive mode, or a neutral drive mode, variations of which are illustrated in FIGS. 2 and 5. In a number of variations, the EMTC 84 may also include a mode shifter 148 which may be used to engage a two-wheel drive mode and a four-wheel drive mode, variations of which are illustrated in FIGS. 4 and 5. In a number of variations, the range shifter 98 and the mode shifter 148 may be mounted coaxially along a primary axis 96, a variation of which is illustrated in FIG. 5. In a number of variations, a gear train 60, which may be off axis or offset from the primary axis 96, may be used to rotate a dual drive gear 62 which may be mounted concentric to the range shifter 98 and the mode shifter 148 around the primary axis 96, and may be used to actuate the range shifter 98 and/or the mode shifter 148, a variation of which is illustrated in FIG. 3. In a number of variations, the gear train 60 may include a plurality of gears 72, 74 which may also be constructed and arranged to be rotated in a clockwise or counterclockwise direction. In a number of variations, the gear train 60 may include an input gear 72 and an intermediate output gear 74. In a number of variations, the intermediate output gear 74 may be driven by the input gear 72. In a number of variations, the intermediate output gear 74 may drive and rotate the dual drive gear 62. In a number of variations, a reversible electric motor 76, which may also be off axis from the primary axis 96, may be operatively connected to the gear train 60 and may be used to control the rotation of the dual drive gear 62 in a clockwise or counterclockwise direction. In a number of variations, an electronic control unit (ECU) 78 may be operatively connected to the reversible electric motor 76 and may be used to control the rotation of the dual drive gear 62, a variation of which is illustrated in FIG. 1. In a number of variations, the ECU 78 may be operatively connected to at least one sensing element 80 which may detect a position of the dual drive gear 62. In a number of variations, the at least one sensing element 80 may be located on a peripheral surface of the dual drive gear 62, a variation of which is illustrated in FIG. 4, and may be mechanical or electrical. In a number of variations, the ECU 78 may then automatically signal the reversible electric motor 76 to drive the dual drive gear 62 in response to the detected position of the dual drive gear 62 by the at least one sensing element 80 for actuating movement of at least one of the range shifter 98 or the mode shifter 148.

Referring to FIG. 1, in a number of variations, the ECU 78 may be constructed and arranged to operate in an automatic drive mode which may automatically control the reversible electric motor 76 to control whether the vehicle 30 is in a four-wheel drive mode or a two-wheel drive mode. In a number of variations, a driver may then manually select whether the vehicle 30 is in high-range or low-range through a range selection device 81 which may be accessible to the driver. In a number of variations, the ECU 78 may be constructed and arranged so that a driver may manually select one of the available drive modes and ranges through a mode/range selection device 82 which may be accessible to the driver. In a number of variations, the ECU 78 may be constructed and arranged so that a driver may choose whether the ECU 78 automatically chooses the drive mode setting or whether the driver may manually choose the drive mode or the range mode through the range/mode selection device 82. In a number of variations, the ECU 78 may process and relay control signals to the EMTC 84 to cause the EMTC 84 to actuate the range shifter 98 and/or the mode shifter 148 in response to the at least one sensing element 80 and/or the detected position of the dual drive gear 62. In a number of variations, the ECU 78 may be part of or may be a general purpose or specific purpose computer.

Referring to FIG. 5, in a number of variations, the EMTC 84 may include an input shaft 90, as discussed above, which may be constructed and arranged to be driven by the power transmission device 34. In a number of variations, the engine 32 may rotate a drive shaft which may be coupled to the power transmission device 34 which may convert the output power from the engine 32 to a geared output drive power. In a number of variations, the output drive power from the power transmission device 34 may be transmitted to the input shaft 90 of the EMTC 84. In a number of variations, the EMTC 84 may then selectively transmit output drive power to the front wheels 58 and/or the rear wheels 48. In a number of variations, the EMTC 84 may include a housing 92 which may surround at least a portion of the range shifter 98, the mode shifter 148, and the dual drive gear 62. In a number of variations, the housing 92 may also include various seals, recesses, shoulders, flanges, bores, etc. which may be constructed and arranged to position and accept various components of the EMTC 84. In a number of variations, the first output shaft 86 and the second output shaft 88 may extend within a portion of the housing 92 and may be rotatable within the housing 92. In a number of variations, a portion of the input shaft 90 may also extend within the housing 92 and may be rotatable within the housing 92 and may be supported by one or more bearing assemblies 94. In a number of variations, the input shaft 90 may be coaxial with the first output shaft 86. In a number of variations, the power transmission device 34 may be used to transfer torque from the first output shaft 86 to the second output shaft 88. In a number of variations, any number of suitable devices may be used as the power transmission device 34 between the first output shaft 86 and the second output shaft 88 including, but not limited to, a belt, a chain, or a gear train.

Referring again to FIG. 5, in a number of variations, the input shaft 90 may be rotatable around a primary axis 96 of rotation. In a number of variations, the range shifter 98 and the mode shifter 148 may be positioned coaxially with the input shaft 90 and may be spaced longitudinally adjacent from each other, which may allow for the use of fewer off-axis components to perform the shifting functions of the range shifter 98 and the mode shifter 148. In a number of variations, the dual drive gear 62 may also be coaxial with the input shaft 90 and may be interposed between the range shifter 98 and the mode shifter 148. In a number of variations, the dual drive gear 62 may be constructed and arranged so that it may be configured for reversible clockwise and counterclockwise rotation about the primary axis 96 through an angular arc of less than 360 degrees. In a number of variations, the dual drive gear 62 may be constructed and arranged so that during a first end portion of angular rotation about the primary axis 96, the dual drive gear 62 engages and operates the range shifter 98 and during a second opposite end portion of angular rotation about the primary axis 96, the dual drive gear 62 actuates the mode shifter 148.

Referring to FIGS. 2 and 5, in a number of variations, a first side 68 of the dual drive gear 62 may be operatively connected to the range shifter 98 and may be used to shift the range shifter 98 to a low-range drive mode, neutral drive mode, or a high-range drive mode through rotation of a barrel cam 100. In a number of variations, the barrel cam 100 may include a barrel tab 102. The barrel tab 102 may include a first portion 104 which may extend radially outward from the outer perimeter of the barrel cam 100 and a second portion 106 which may extend axially from the first portion toward the dual drive gear 62, a variation of which is illustrated in FIG. 2. The barrel tab 102 may be constructed and arranged to be actuated by an actuating tab 64 on the dual drive gear 62, as will be discussed hereafter. In a number of variations, the barrel cam 100 may include a cam surface groove 108 which may extend circumferentially and axially along an interior surface of the barrel cam 100 to define an axial range shift movement in response to rotation of the barrel cam 100. In a number of variations, the cam surface groove 108 may include a first end portion 110, a second end portion 112, and an intermediate portion 114 extending therebetween. The first end portion 110 may include a predetermined circumferential arcuate length and may lie in a first plane perpendicular to the primary axis 96. The second end portion 110 may include a predetermined circumferential arcuate length and may lie in a second plane perpendicular to the primary axis 96 spaced from the first plane. The intermediate portion 114 of the cam surface groove 108 may extend acutely and axially between the first end portion 110 and the second end portion 112 to define axial shifting movement of a shift fork 116 between the low-range and high-range drive mode, as will be discussed hereafter. The barrel cam 100 may be rotatable about the primary axis 96 through an arc of less than 360 degrees in response to rotation of the dual drive gear 62 in either rotational direction.

In a number of variations, the range shifter 98 may also include a shift collar 126 which may include an axial groove 128 which may allow passage of a first and second pin 122 of the shift fork 116 to move radially into engagement within the cam surface groove 108 of the barrel cam 100 for driving axial travel of the shift fork 116 in response to rotation of the barrel cam 100. The shift fork 116 may act as a cam follower traveling within the cam surface groove 108 of the barrel cam 100 as the barrel cam 100 may be rotated in either rotational direction. The shift fork 116, barrel cam 100, and shift collar 126 may surround an axially moveable and rotatable internal range sleeve 130. The internal range sleeve 130 may include a groove 132 which may be engageable with a protrusion 124 on the inner surface 120 of the shift fork 116 which may allow for rotation of the internal range sleeve 130 relative to the shift fork 116. In one variation, the shift collar 126 may comprise a cylindrical element which may support the shift fork 116 through the axial groove 128 which may allow for guided axial movement of the shift fork 116 and may prevent rotational movement of the shift fork 116. The shift collar 126 may allow the shift fork 116 to slide in an axial direction to drive the internal range sleeve 130 in response to shifting rotational movement of the barrel cam 100 between a low-range angular position, neutral angular position, and a high-range angular position.

Referring to FIG. 5, in a number of variations, the internal range sleeve 130 may be engageable between the range shifter 98 and a gear reduction assembly 138 to the first output shaft 86 through a splined connection which my allow for axial movement of the internal range sleeve 130 with respect to the first output shaft 86. The gear reduction assembly 138 may vary the drive power between the input shaft 90 and the first and the second output shaft 86, 88. In a number of variations, the gear reduction assembly 138 may include a planetary gear assembly 212 which may include a plurality of planetary gears 214 which may be operatively attached to a gear carrier 216. The plurality of planetary gears 214 may rotate within a ring gear 218 and may be driven by a sun gear 220. In a number of variations, when the shift fork 116 may be driven into a low-range drive mode portion of the cam surface groove 108, the internal range sleeve 130 may axially move to couple the first output shaft 86 with the planetary gear carrier 216. When the shift fork 116 may be driven into a high-range drive mode portion of the cam surface groove 108, the internal range sleeve 130 may axially move to couple the first output shaft 86 with the sun gear 220. The gear teeth 222 of the internal range sleeve 130 may engage with the internal teeth 224 of the sun gear 220. The sun gear 220 may be driven by the input shaft 90. The plurality of planetary gears 214 may be rotatable around the sun gear 220 and may be driven by the sun gear 220. Drive torque may be transferred to the first output shaft 86 directly from the sun gear 220 or indirectly through the planetary gear carrier 216 depending on the drive ratio desired. The gearing ratio between the sun gear 220 and the plurality of planetary gears 214 may be a reduction ratio, rotating the first output shaft 86 at a different speed than the input shaft 90. In a number of variations, the reduction ratio may be in a range between approximately 1:1 to approximately 10:1, inclusive, with a preferred ratio of approximately 2.6:1. In a number of variations, the reduction gear set 138 may include a reduction hub 139. It is noted that a person having ordinary skill in the art would recognize that any number of gear reduction assembly designs other than the one illustrated above may be used in the EMTC 84 without departing from the spirit and scope of the invention.

In a number of variations, a torsional wrap spring 140 may surround a portion of the outer circumference of the barrel or range cam 100 for biasing the barrel cam 100 to follow rotational movement of the dual drive gear 62, which may allow for completion of range shift movement if temporarily blocked due to unmeshed gear teeth engagement during axial movement. The torsional wrap spring 140 may hold the barrel tab 102 and the dual drive gear actuating tab 64 in radial alignment with each other after completion of rotational driving movement. The torsional wrap spring 140 may be constrained to follow movement of the dual drive gear 62 and may be loaded with force in either rotational direction of the dual drive gear 62. The loaded force of the torsional wrap spring 140 may urge rotational movement of the barrel cam 100 to follow rotational movement of the dual drive gear 62. When the torsional wrap spring 140 may be loaded with force, the torsional wrap spring 140 continually biases the barrel cam 100 in the desired direction of movement until the range shift movement may be completed. In a number of variations, the barrel cam 100 may be rotatably biased toward the desired rotational movement by the torsional wrap spring 140, even if axial movement of the shift fork 116 may be temporarily blocked while the dual drive gear 62 continues to rotate. If the barrel cam 100 may be axially blocked during rotation, the torsional wrap spring 140 may be loaded with rotational energy to bias the barrel cam 100 to move into a desired orientation when the blocked condition ceases. The torsional wrap spring 140 may store energy between the reverse electric motor 76 and the shift fork 116 until the desired range mode shift may be completed.

In a number of variations, the barrel cam 100 may be interposed between a first thrust bushing 142 and a second thrust bushing 144. The dual drive gear 62 may be positioned axially adjacent to the barrel cam 100, the first thrust bushing 142 and one or more ring members 146 which may be interposed between the barrel cam 100 and the dual drive gear 62. In a number of variations, the EMTC 84 may not include at least one of the first thrust bushing, 142, the second thrust bushing 144, or the one or more ring members 146. The dual drive gear 62 may also include a dual drive gear actuating tab 64, as discussed above, which may extend axially toward the range shifter 98 and may be radially spaced from the barrel cam 100. The dual drive gear actuating tab 64 may move angularly in either rotational direction (clockwise or counterclockwise) with respect to the barrel tab 102 and may be independently rotatable from the barrel tab 102.

In a number of variations, the dual drive gear 62 may actuate the range shifter 98 through rotational movement of the dual drive gear actuating tab 64. In a number of variations, when the vehicle 30 may be in a low-range drive mode, or a high-range drive mode, the shift fork 116 may be in the first end portion 110 or the second end portion 112 of the cam groove surface 108. When the shift fork 116 may be in the first or second end portion 110, 112 of the cam groove surface 108, the mode shifter 148 may be actuated.

Figure 6:
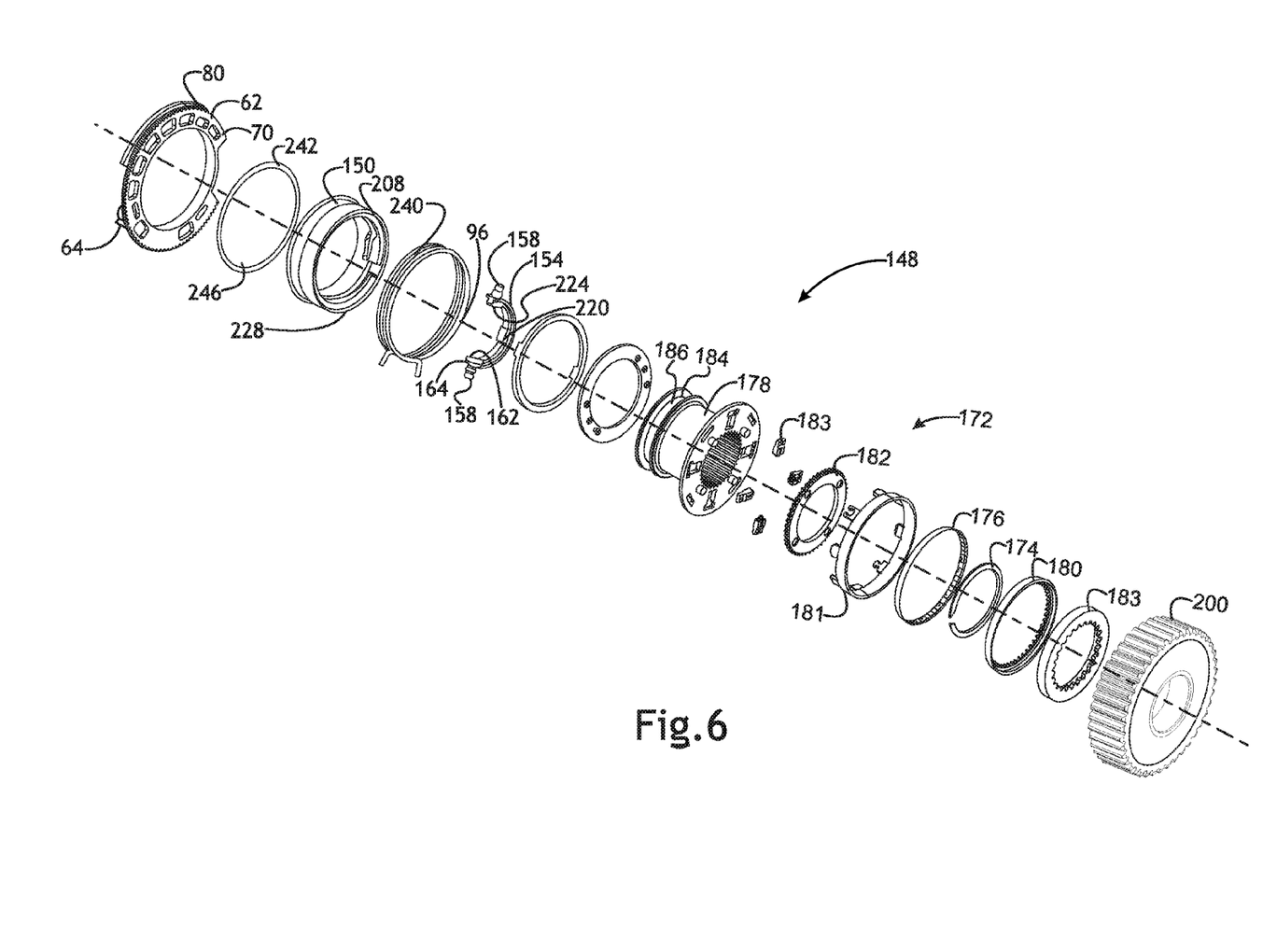
FIG. 6 illustrates a section view of a mode shifter and/or synchronizer according to a number of variations.

Referring to FIGS. 4-6, in a number of variations, the mode shifter 148 may include a mode cam 150 which may actuate a synchronizer 172. In a number of variations, the mode cam 150 may be rigidly attached to the dual drive gear 62 so that the mode cam 150 may rotate with the dual drive gear 62. In a number of variations, the mode shifter 148 side of the dual drive gear 62 may include a second thrust bushing 242 and one or more ring members 246 which may be interposed between a mode cam 150 and the dual drive gear 62. In a number of variations, the EMTC 84 may not include at least one of the second thrust bushing 244, or the one or more ring members 246. In a number of variations, the mode cam 150 may also include a cam surface groove 152 which may extend circumferentially and axially along an inner surface 153 of the inner perimeter of the mode cam 150 and may form a wave-like pattern to define an axial travel path for a mode shift fork 154 in response to rotation of the mode cam 150 as discussed below. In a number of variations, the mode cam 150 may be rotatable about the primary axis 96 through an arc of less than 360 degrees in response to rotation of the dual drive gear 62 in either rotational direction.

In a number of variations, the mode cam 150 may actuate any number of variations of synchronizers 172 including, but not limited to, a single-cone, dual-cone, or triple-cone synchronizer. In a number of variations, the synchronizer 172 may include one or more internal rings 174, a blocker ring 176, a synchronizer sleeve or mode hub sleeve, which functions as the shifter 178, a hub 180, and an engagement ring 182. In a number of variations, the synchronizer sleeve or mode hub sleeve 178 may include a groove 184 along an outer surface 186 of the mode sleeve 188 which may be constructed and arranged to accommodate a second portion 166 of a mode shift fork 154, as will be discussed hereafter. In a number of variations, the synchronizer 172 may be an outer cone synchronizer. In a number of variations, as shown in FIG. 6, the synchronizer 172 may include an attachment hub 181. The attachment hub 181 may attach the engagement ring 182 to the synchronizer sleeve or mode hub sleeve 178 through use of at least one attachment pieces 183. In a number of variations, the synchronizer 172 may further include a synchronizer sprocket engagement ring 183. In a number of variations, the sprocket 200 may be located axially adjacent to the synchronizer engagement ring 183 of the synchronizer 172.

In a number of variations, a mode shift fork 154 may be operatively attached to the mode cam 150 and the synchronizer 172 and may be used to shift the vehicle 30 between two-wheel drive and four-wheel drive. The mode shift fork 154 may include a first portion 156 and a second portion 166. The first portion 156 may be constructed and arranged to operatively connect to the mode cam 150 and a mode sleeve 188. In a number of variations, the first portion 156 may include a first and second pin 158 which may extend radially from opposing ends of an outer surface 160 of the first portion 156. In a number of variations, the pins 158 may be constructed and arranged to travel within the mode cam surface groove 152 to allow for axial travel of the mode shift fork 154 in response to rotation of the mode cam 150. In a number of variations, the first portion 156 of the mode shift fork 154 may also include a protrusion 162 which may extend along a center portion of an inner surface 164 of the first portion 156 and may be constructed and arranged to rotate within a mode sleeve groove 190 in the mode sleeve 188, as will be discussed hereafter. In a number of variations, the second portion 166 may be constructed and arranged to operatively attach to the synchronizer sleeve or mode hub sleeve 178 and may move the synchronizer sleeve or mode hub sleeve 178 axially in response to rotation of the mode cam 150. In a number of variations, the second portion 166 may include a protrusion 168 on an inner surface 170 of the second portion 166 which may be constructed and arranged to sit within a groove 184 in the synchronizer sleeve or mode hub sleeve 178 so that the synchronizer sleeve or mode hub sleeve 178 may be moved axially in relation to the axial movement of the mode shift fork 154.

In a number of variations, the mode sleeve 188 may extend around the first output shaft 86 and may move axially along the first output shaft 86. In a number of variations, the mode sleeve 188 may be cylindrical and may include a first lip 192 and a second lip 194 constructed and arranged to form the mode sleeve groove 190 which may accommodate the protrusion 162 on the first portion 156 of the mode shift fork 154 which may hold the mode shift fork 154 in place. In a number of variations, a wave spring 196 and a snap ring 198 (which may act as a shoulder for the wave spring 196)

may be interposed between the mode sleeve 188 and the mode shift fork 154. In a number of variations, the wave spring 196 may provide a tension on the mode sleeve 188 and mode shift fork 154 which may assist in moving the mode sleeve 188 and mode shift fork 154 back axially toward the dual drive gear 62 when the vehicle 30 may be shifted from four-wheel drive back to two-wheel drive.

In a number of variations, a first sleeve 202 may be axially adjacent to the second side 70 of the dual drive gear 62 and may extend within the inner perimeter of the dual drive gear 62 and may be used to rigidly fix the mode cam 150 to the dual drive gear 62. In a number of variations, a portion of the snap ring 198 may fit within the inner perimeter of the first sleeve 202. In a number of variations, a thrust washer 204 may sit within a portion of the snap ring 198. In a number of variations, a first side 208 of a separator thrust washer 206 may lay axially adjacent to the snap ring 198 and thrust washer 204 and a second side 210 of the separator thrust washer 206 may lay axially adjacent to the mode cam 150. In a number of variations, the sprocket 200 may be located axially adjacent to the engagement ring 182 of the synchronizer 172.

In a number of variations, when the range shifter 98 may be in a low-range drive mode or a high-range drive mode, the mode shifter 98 may be actuated to shift the vehicle 30 between the two-wheel drive mode and the four-wheel drive mode. During a two-wheel drive mode, the first output shaft 86 may rotate within the sprocket 200 without causing the sprocket 200 to rotate. In a number of variations, the dual drive gear 62 may be rotated which may cause the mode cam 150 to rotate. This may cause the mode shift fork 154 to move axially toward the direction of the sprocket 200 which may cause the engagement ring 182 of the synchronizer 172 to push against and engage the sprocket 200 to cause the sprocket 200 to rotate. In a number of variations, the blocker ring 176 may prevent the synchronizer sleeve or mode hub sleeve 178 from engaging the engagement ring 182 while the sprocket 200 and the engagement ring 182 rotate at different speeds. Once the rotation of the sprocket 200 and the engagement ring 182 may be synchronized, the synchronizer sleeve or mode hub sleeve 178 may continue to axially move into a spline engagement with the engagement ring 182 so that the sprocket 200 and the first output shaft 86 may be operatively attached. In a number of variations, the synchronizer 172 may allow for engagement of four-wheel drive quickly by bringing the rotation of the sprocket 200 up to speed with the rotation of the first output shaft 86 so that alignment of the teeth on the engagement ring 182 and the synchronizer sleeve or mode hub sleeve 178 occurs quickly.

In a number of variations, as shown in FIG. 6, the mode shifter 148 may include a mode cam 150 which may include an axial groove 228 which may allow passage of a first and second pin 158 of a shift fork 154 to move radially into engagement within the cam surface groove 208 of the mode cam 150 for driving axial travel of the shift fork 154 in response to rotation of mode cam 150. The shift fork 154 may act as a cam follower traveling within the cam surface groove 208 of the mode cam 150 as the mode cam 150 may be rotated in either rotational direction. The mode shift fork 154 and mode cam 150 may surround an axially moveable and rotatable synchronizer sleeve or mode hub sleeve 178. In a number of variations, the mode cam 150 may be interposed between a first thrust bushing 242. The dual drive gear 62 may be positioned axially adjacent to the mode cam 150, the first thrust bushing 242 and one or more ring members 246 which may be interposed between the mode cam 150 and the dual drive gear 62. The synchronizer sleeve or mode hub sleeve 178 may include a groove 184 which may be engageable with a protrusion 224 on the inner surface 220 of the mode shift fork 154 which may allow for rotation of the synchronizer sleeve or mode hub sleeve 178 relative to the shift fork 154. In a number of variations, the synchronizer sleeve or mode hub sleeve 178 may comprise a cylindrical element which may support the shift fork 154 through the axial groove 184 which may allow for guided axial movement of the shift fork 154 and may prevent rotational movement of the shift fork 154. The synchronizer sleeve or mode hub sleeve 178 may allow the shift fork 154 to slide in an axial direction to drive the synchronizer sleeve or mode hub sleeve 178 in response to shifting rotational movement of the mode cam 150 between a four-wheel drive and two-wheel drive position for mode shift movement.

In a number of variations, the synchronizer sleeve or mode hub sleeve 178 may be engageable between the mode shifter 148 and a gear reduction assembly 138 to the first output shaft 86 through a splined connection which my allow for axial movement of the synchronizer sleeve or mode hub sleeve 178 with respect to the first output shaft 86. The gear reduction assembly 138 may vary the drive power between the input shaft 90 and the first and the second output shaft 86, 88. In a number of variations, the gear reduction assembly 138 may include a planetary gear assembly 212 which may include a plurality of planetary gears 214 which may be operatively attached to a gear carrier 216. The plurality of planetary gears 214 may rotate within a ring gear 218 and may be driven by a sun gear 220. In a number of variations, when the mode shift fork 154 may be driven into a two wheel drive portion of the mode cam surface groove 208, the synchronizer sleeve or mode hub sleeve 178 may axially move to couple the first output shaft 86 with the planetary gear carrier 216. When the mode shift fork 154 may be driven into a four wheel drive mode portion of the mode cam surface groove 208, the synchronizer sleeve or mode hub sleeve 178 may axially move to couple the first output shaft 86 and second output shaft 88 with the sun gear 220. The gear teeth 222 of the engagement ring 182 may engage with the internal teeth 224 of the sun gear 220. The sun gear 220 may be driven by the input shaft 90. The plurality of planetary gears 214 may be rotatable around the sun gear 220 and may be driven by the sun gear 220. Drive torque may be transferred to the first output shaft 86 directly from the sun gear 220 or indirectly through the planetary gear carrier 216 depending on the drive ratio desired. The gearing ratio between the sun gear 220 and the plurality of planetary gears 214 may be a reduction ratio, rotating the first output shaft 86 at a different speed than the input shaft 90. In a number of variations, the reduction ratio may be in a range between approximately 1:1 to approximately 10:1, inclusive, with a preferred ratio of approximately 2.6:1. It is noted that a person having ordinary skill in the art would recognize that any number of gear reduction assembly designs other than the one illustrated above may be used in the EMTC 84 without departing from the spirit and scope of the invention.

In a number of variations, a torsional wrap spring 240 may surround a portion of the outer circumference of the mode cam 150 for biasing the mode cam 150 to follow rotational movement of the dual drive gear 62, which may allow for completion of mode shift movement if temporarily blocked due to unmeshed gear teeth engagement during axial movement. In a number of variations the torsional wrap spring 240 may hold the mode cam 150 and the dual drive gear 62 in radial alignment with each other after completion of rotational driving movement. The torsional wrap spring 240 may be constrained to follow movement of the dual drive gear 62 and may be loaded with force in either rotational direction of the dual drive gear 62. The loaded force of the torsional wrap spring 240 may urge rotational movement of the mode cam 150 to follow rotational movement of the dual drive gear 62. When the torsional wrap spring 240 may be loaded with force, the torsional wrap spring 240 continually biases the mode cam 150 in the desired direction of movement until the mode shift movement may be completed. In a number of variations, the mode cam 150 may be rotatably biased toward the desired rotational movement by the torsional wrap spring 140, even if axial movement of the mode shift fork 154 may be temporarily blocked while the dual drive gear 62 continues to rotate. If the mode cam 150 may be axially blocked during rotation, the torsional wrap spring 240 may be loaded with rotational energy to bias the barrel cam 100 to move into a desired orientation when the blocked condition ceases. The torsional wrap spring 240 may store energy between the reverse electric motor 76 and the shift fork 154 until the desired range mode shift may be completed. In a number of variations, the direction of the reversible electric motor 76 may actuate the mode shift between a four wheel drive and a two wheel drive. In a number of variations, this may be accomplished by the actuation of the electric motor rotating the dual drive gear to rotate the mode cam 150 via the torsional wrap spring 240, which in turn rotates the synchronizer sleeve or mode hub sleeve 178 and the synchronizer 172. This may be done when the range cam reaches either high or low range where the range shift fork 116 goes into a dwell period within the range barrel cam 100.

In a number of variations, the mode cam 150 may be interposed between a first thrust bushing 242 and a second thrust bushing 244. The dual drive gear 62 may be positioned axially adjacent to the mode cam 150, the first thrust bushing 242 and one or more ring members 246 which may be interposed between the mode cam 150 and the dual drive gear 62. In a number of variations, the EMTC 84 may not include at least one of the first thrust bushing, 242, the second thrust bushing 244, or the one or more ring members 246.

In a number of variations, the dual drive gear 62 may actuate the mode shifter 148 through rotational movement of the dual drive gear 62 and the mode cam 150. In a number of variations, when the vehicle 30 may be in a low-range drive mode, or a high-range drive mode, the shift fork 116 may be in the first end portion 110 or the second end portion 112 of the cam groove surface 108. When the shift fork 116 may be in the first or second end portion 110, 112 of the cam groove surface 108, the mode shifter 148 may be actuated through used of the electric motor 76 and reduction gear set 138. This may be accomplished as the electric motor 76 rotates the gear train 60 to rotate the dual drive gear 62 clockwise or counterclockwise. When this happens, the four wheel drive may be engaged when the mode cam 150 rotates and actuates the synchronizer 172 from its center as the shift fork 154 aligns mode cam 150 and synchronizer for dual rotation. The shift fork 154 may then go into a dwell in the cam surface groove 208 during operation of either two wheel or four wheel drive. In a number of variations, rotation of the electric motor 76 in one direction may actuate the mode shifter 148 into two drive and rotation of the electric motor in the opposite direction may actuate the mode shifter 148 into four wheel drive.

Figure 7:
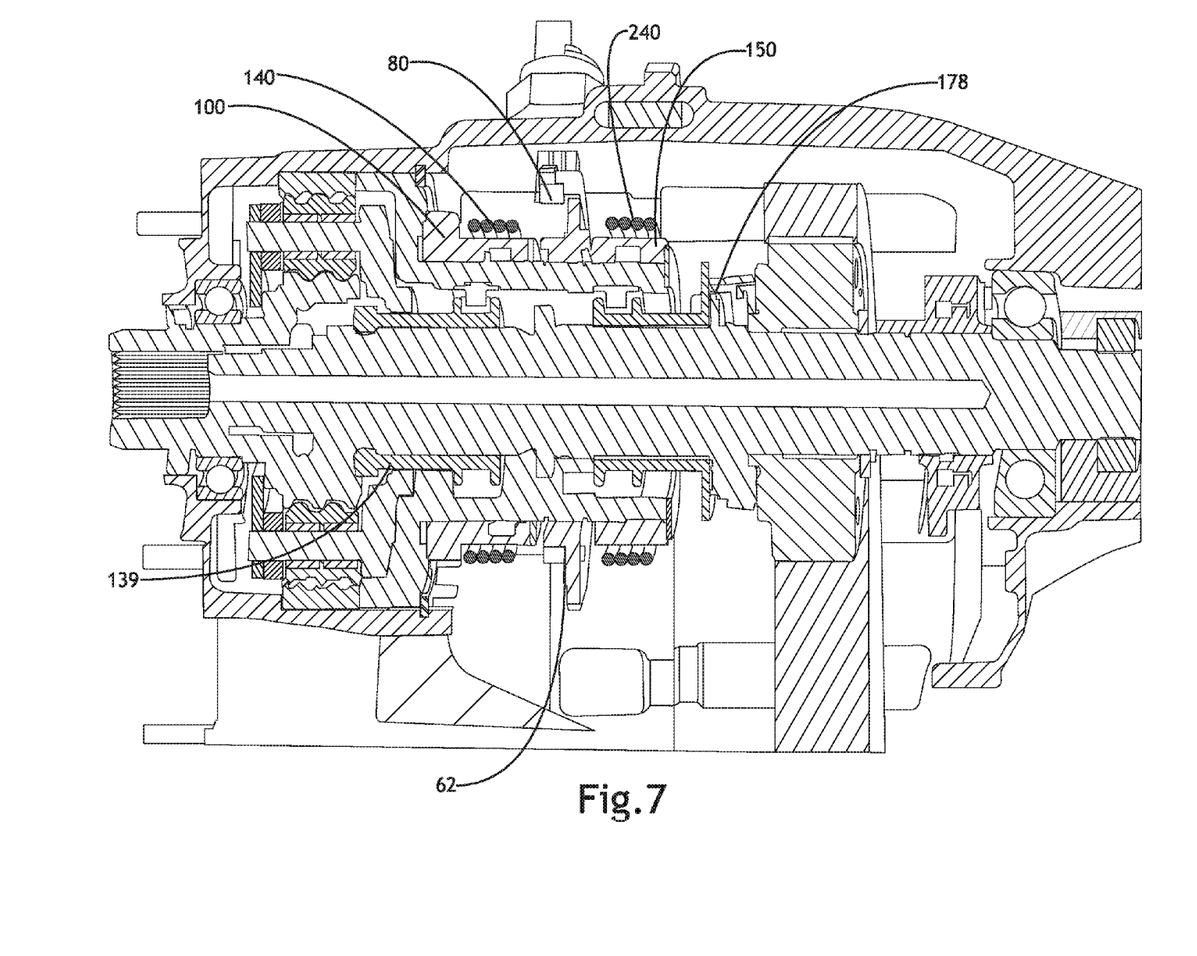
FIG. 7 illustrates a section view of a transfer case according to a number of variations.

In a number of variations, as shown in FIG. 7, the reduction gear set 138 may be operatively connected to a reduction hub 139. In a number of variations, the reduction hub 139 may be operatively connected to the internal range sleeve 130. In a number of variations, the reduction hub 139 may be operatively connected to the synchronizer sleeve or mode hub sleeve 178. In a number of variations, the reduction gear set 138 may be operatively connected to rotate the dual-drive gear 62. In a number of variations, the electric motor 76 may get a signal from the ECU 78 when the range cam 100 reaches high or low range. In a number of variations, the ECU 78 may actuate rotation of the gear train 60 via the electric motor 76 to either move the mode shifter 148 from a two-wheel drive to a four-wheel drive, or vice versa.

Figure 8:
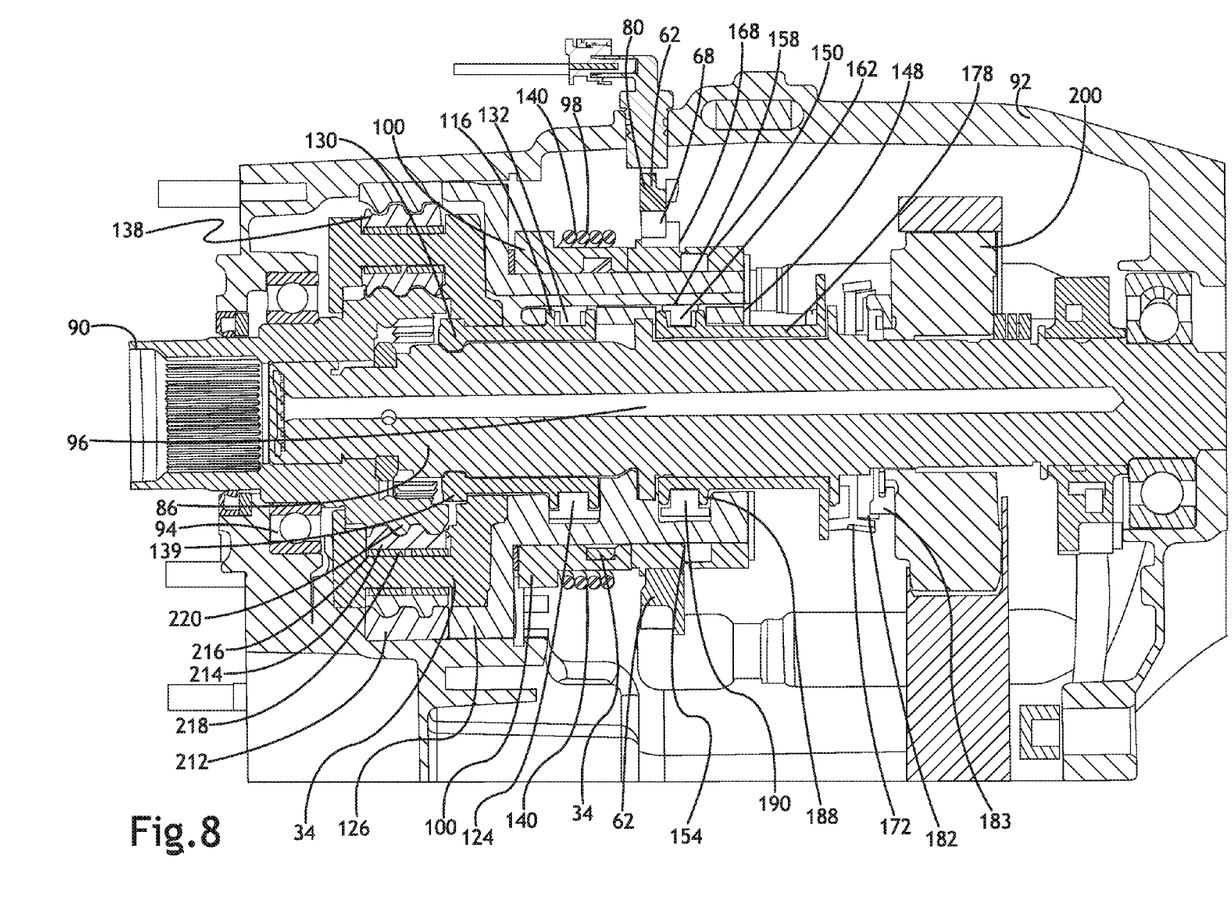
FIG. 8 illustrates a section view of a transfer case according to a number of variations.
Figure 9:
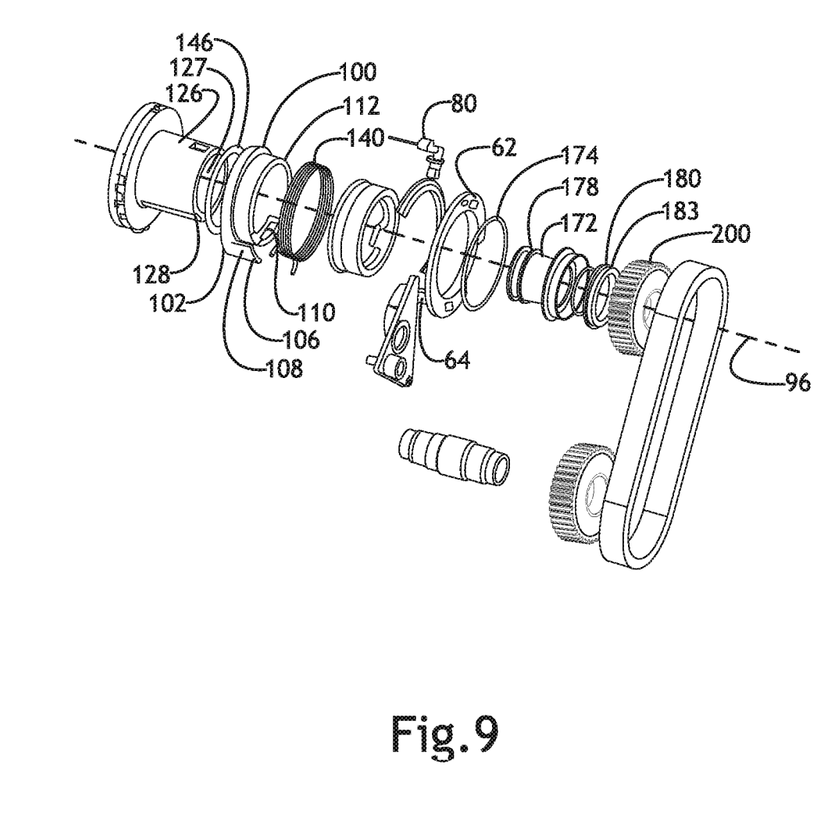
FIG. 9 illustrates a section view of a transfer case according to a number of variations.

In a number of variations, as shown in FIGS. 8-9, the torsional wrap springs 140, 240 around the range cam 100 and mode cam 150 may be combined to a single torsional spring 140'. In a number of variations, the torsional spring 140' may wrap around the range cam 100. In a number of variations, the torsional spring 140' may bias the range cam 100 to follow rotational movement of the dual drive gear 62, which may allow for completion of range shift movement if temporarily blocked due to unmeshed gear teeth engagement during axial movement. The torsional wrap spring 140' may hold the barrel tab 102 and the dual drive gear actuating tab 64 in radial alignment with each other after completion of rotational driving movement. The torsional wrap spring 140' may be constrained to follow movement of the dual drive gear 62 and may be loaded with force in either rotational direction of the dual drive gear 62. The loaded force of the torsional wrap spring 140' may urge rotational movement of the barrel cam 100 to follow rotational movement of the dual drive gear 62. When the torsional wrap spring 140' may be loaded with force, the torsional wrap spring 140 continually biases the barrel cam 100 in the desired direction of movement until the range shift movement may be completed. In a number of variations, the barrel cam 100 may be rotatably biased toward the desired rotational movement by the torsional wrap spring 140', even if axial movement of the shift fork 116 may be temporarily blocked while the dual drive gear 62 continues to rotate. If the barrel cam 100 may be axially blocked during rotation, the torsional wrap spring 140' may be loaded with rotational energy to bias the barrel cam 100 to move into a desired orientation when the blocked condition ceases. The torsional wrap spring 140 may store energy between the reverse electric motor 76 and the shift fork 116 until the desired range mode shift may be completed. In a number of variations, the wrap spring 140' may provide a tension on the mode sleeve 188 and mode shift fork 154 which may assist in moving the mode sleeve 188 and mode shift fork 154 back axially toward the dual drive gear 62 when the vehicle 30 may be shifted from four-wheel drive back to two-wheel drive. In a number of variations, the wrap spring 140' may be interposed between the barrel/range cam 100 and the mode cam 150, as shown in FIG. 9.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a transfer case comprising: an input shaft having a primary axis of rotation; a first output shaft which is concentric with the input shaft; a second output shaft offset from the first output shaft; a range shifter comprising a first cam rotatable about the primary axis constructed and arranged to selectively shift a vehicle to a high-range drive mode, a low range drive mode, or a neutral drive mode; a mode shifter comprising a second cam rotatable about the primary axis constructed and arranged to actuate a synchronizer which selectively shifts the vehicle between a two-wheel drive and a four-wheel drive mode; a dual drive gear interposed between the range shifter and the mode shifter, wherein a first side of the dual drive gear includes an actuating tab constructed and arranged to actuate the first cam and wherein the second cam is attached to a second side of the dual drive gear so that the mode shifter is activated by rotation of the dual drive gear a gear train operatively connected to the dual drive gear to drive the dual gear drive, wherein the gear train has a first axis offset from the primary axis; and a reversible electric motor which drives the gear train wherein direction of the rotation of the electric motor determines engagement or disengagement of the mode shifter to selectively shift the vehicle between a two-wheel drive and a four-wheel drive mode.

Variation 2 may include a transfer case as set forth in Variation 1 further comprising a housing surrounding at least a portion of the input shaft, the first output shaft, the second output shaft, the range shifter, the mode shifter, and the dual drive gear.

Variation 3 may include a transfer case as set forth in any of Variations 1-2 further comprising a electronic control unit constructed and arranged to control the reversible electric motor.

Variation 4 may include a transfer case as set forth in any of Variations 1-3 wherein the range shifter further comprising a spring interposed between the first cam and the dual drive gear which is constructed and arranged to bias the first cam to follow reversible rotational movement of the dual drive gear; a shift fork constructed and arranged to travel along a groove in the first cam in response to rotation of the first cam; a shift collar constructed and arranged to include an axial groove for supporting the shift fork and to allow axial movement of the shift fork while restricting rotation of the shift fork; and an internal range sleeve operatively connected to the shift fork to move axially in response to rotation of the first cam.

Variation 5 may include a transfer case as set forth in any of Variations 1-4 wherein the mode shifter further comprises a shift fork constructed and arranged to travel along a groove in the mode cam, a mode sleeve operatively attached to the shift fork and axially slideable on the first output shaft, a spring interposed between the shift fork and the mode sleeve constructed and arranged to bias the mode sleeve so that when the vehicle returns to the two-wheel drive mode, the spring applies a force to the mode sleeve to push the mode sleeve back axially toward the dual drive gear.

Variation 6 may include a transfer case as set forth in Variation 5 wherein the synchronizer includes an outer cone synchronizer comprising an engagement ring axially adjacent to a sprocket, wherein the engagement ring is constructed and arranged to move axially toward the sprocket when the shift fork is moved axially toward the sprocket from rotation of the second cam so that the synchronizer rotates the sprocket to a speed of the first output shaft.

Variation 7 may include a transfer case as set forth in any of Variations 1-6 further comprising at least one sensing element located on a peripheral surface of the dual drive gear for detecting a position of the dual drive gear; and an electronic control unit for actuating the range shifter and the mode shifter in response to the detected position of the dual drive gear by the at least one sensing element.

Variation 8 may include a transfer case comprising: an input shaft having a primary axis of rotation; a first output shaft which is concentric with the input shaft; a second output shaft offset from the first output shaft; a range shifter comprising a first cam, a first shift fork, wherein the first shift fork is driven axially by the first cam, and a first sleeve which is axially driven by the first shift fork; a mode shifter comprising a second cam, a second shift fork, wherein the second shift fork is driven axially by the second cam, and a synchronizer, wherein the synchronizer is actuated by the second shift fork through rotation of the second cam; a dual drive gear, wherein the dual drive gear is rotated in a forward and a reverse direction to actuate the range shifter and the mode shifter a gear train operatively connected to the dual drive gear to drive the dual gear drive; and a reversible electric motor which drives the gear train wherein direction of the rotation of the electric motor determines engagement or disengagement of the mode shifter to selectively shift the vehicle between a two-wheel drive and a four-wheel drive mode.

Variation 9 may include a transfer case as set forth in Variation 8 wherein the range shifter is constructed and arranged to shift a vehicle from a low-range drive mode to a high-range drive mode and the mode shifter is constructed and arranged to shift the vehicle from a two-wheel drive mode to a four-wheel drive mode.

Variation 10 may include a transfer case as set forth in any of Variations 8-9 wherein the dual drive gear further comprises a first actuating tab constructed and arranged to actuate a first tab on the first cam.

Variation 11 may include a transfer case as set forth in any of Variations 8-10 further comprising a gear reduction assembly, wherein the first sleeve is engageable between at least one of the range shifter or the mode shifter and the gear reduction assembly to the first output shaft through a splined connection with respect to the first output shaft.

Variation 12 may include a transfer case as set forth in Variation 11 wherein the gear reduction assembly further includes a planetary gear set comprising a plurality of planetary gears operatively connected to a gear carrier, wherein the plurality of planetary gears rotate within a ring gear and are driven by a sun gear.

Variation 13 may include a transfer case as set forth in Variation 12 wherein the first cam includes a groove having a low-range portion and a high-range portion, and wherein when the first shift fork is driven to the low-range drive mode portion of the groove, the first sleeve moves axially to couple the first output shaft with the planetary gear carrier and when the first shift fork is driven to the high-range drive mode portion of the groove, the first sleeve moves axially to couple the first output shaft with the sun gear.

Variation 14 may include a transfer case as set forth in any of Variations 8-13 further comprising a spring wherein the spring is interposed between the first cam and the second cam and is constructed and arranged to bias the first cam to follow reversible rotational movement of the dual drive gear and is constructed and arranged to bias the mode sleeve so that when the vehicle returns to the two-wheel drive mode, the spring applies a force to the mode sleeve to push the mode sleeve back axially toward the dual drive gear.

Variation 15 may include a transfer case as set forth in any of Variations 8-14 further comprising at least one sensing element located on a peripheral surface of the dual drive gear for detecting a position of the dual drive gear; and an electronic control unit for actuating the range shifter and the mode shifter in response to the detected position of the dual drive gear by the at least one sensing element and wherein the transfer case further comprises an electronic control unit which actuates the electric motor to actuate the range shifter and the mode shifter in response to the detected position of the dual drive gear by the at least one sensing element.

Variation 16 may include a transfer case as set forth in any of Variations 8-15 wherein the synchronizer further includes an outer cone synchronizer comprising an engagement ring axially adjacent to a sprocket, wherein the engagement ring is constructed and arranged to move axially toward the sprocket when the shift fork is moved axially toward the sprocket from rotation of the second cam so that the synchronizer rotates the sprocket to a speed of the first output shaft.

Variation 17 may include a method for assembling a transfer case comprising: providing an input shaft and a first output shaft coaxially on a primary axis of rotation; providing a second output shaft offset from the first output shaft; providing a power transmission device interposed between the first output shaft and the second output shaft; providing a range shifter operatively attached to the first output shaft comprising a first cam constructed and arranged for shifting between a low-range drive mode, a high-range drive mode, and a neutral drive mode; providing a mode shifter for shift-on-the-fly comprising a second cam operatively attached to a synchronizer constructed and arranged for shifting between a two-wheel drive mode and a four-wheel drive mode; providing a dual drive gear between the range shifter and the mode shifter constructed and arranged so that rotation of the dual drive gear actuates the range shifter and the mode shifter; providing a gear train off axis from the primary axis constructed and arranged to drive the dual drive gear in a clockwise and counter clockwise direction; and providing a reversible electric motor which drives the gear train wherein direction of the rotation of the electric motor determines engagement or disengagement of the mode shifter to selectively shift the vehicle between a two-wheel drive and a four-wheel drive mode.

Variation 18 may include a method as set forth in Variation 17 wherein the synchronizer further includes an outer cone synchronizer comprising an engagement ring axially adjacent to a sprocket, wherein the engagement ring is constructed and arranged to move axially toward the sprocket when the shift fork is moved axially toward the sprocket from rotation of the second cam so that the synchronizer rotates the sprocket to a speed of the first output shaft.

Variation 19 may include a method as set forth in any of Variations 17-18 further comprising an electronic control unit operatively connected to the electric motor constructed and arranged for controlling operation of the electric motor.

Variation 20 may include a method as set forth in any of Variations 17-19 further comprising at least one sensing element located on the dual drive gear for detecting a position of the dual drive gear; and an electronic control unit for actuating at least one of the range shifter and the mode shifter in response to the detected position of the dual drive gear by the at least one sensing element.

The above description of select variations within the scope of the invention is merely illustrative in nature and, thus, variations or variants thereof are not to be regarded as a departure from the spirit and scope of the invention.

What is claimed is:
1. A transfer case comprising:
   an input shaft having a primary axis of rotation;
   a first output shaft which is concentric with the input shaft;
   a second output shaft radially offset from the first output shaft;
   a range shifter comprising a first cam rotatable about the primary axis constructed and arranged to selectively shift a vehicle to a high-range drive mode, a low range drive mode, or a neutral drive mode;
   a mode shifter comprising a second cam rotatable about the primary axis constructed and arranged to actuate a synchronizer which selectively shifts the vehicle between a two-wheel drive mode and a four-wheel drive mode;
   a dual drive gear interposed between the range shifter and the mode shifter, wherein a first side of the dual drive gear includes an actuating tab constructed and arranged to actuate the first cam and wherein the second cam is attached to a second side of the dual drive gear so that the mode shifter is activated by rotation of the dual drive gear;
   a gear train operatively connected to the dual drive gear to drive the dual gear drive, wherein the gear train has a first axis offset from the primary axis; and
   a reversible electric motor which drives the gear train, wherein direction of the rotation of the electric motor determines engagement or disengagement of the mode shifter to selectively shift the vehicle between the two-wheel drive mode and the four-wheel drive mode.

2. The transfer case of claim 1 further comprising a housing surrounding at least a portion of the input shaft, the first output shaft, the second output shaft, the range shifter, the mode shifter, the dual drive gear, and the electric motor.

3. The transfer case of claim 1 further comprising an electronic control unit constructed and arranged to control the reversible electric motor.

4. The transfer case of claim 3 further comprising at least one sensing element located on a peripheral surface of the dual drive gear for detecting a position of the dual drive gear; and wherein the electronic control unit actuates the electric motor to actuate the range shifter and the mode shifter in response to the detected position of the dual drive gear by the at least one sensing element.

5. The transfer case of claim 1 wherein the range shifter further comprising a spring interposed between the first cam and the dual drive gear which is constructed and arranged to bias the first cam to follow reversible rotational movement of the dual drive gear;
   a shift fork constructed and arranged to travel along a groove in the first cam in response to rotation of the first cam;
   a shift collar constructed and arranged to include an axial groove for supporting the shift fork and to allow axial movement of the shift fork while restricting rotation of the shift fork; and
   an internal range sleeve operatively connected to the shift fork to move axially in response to rotation of the first cam.

6. The transfer case of claim 1 wherein the mode shifter further comprises a shift fork constructed and arranged to travel along a groove in the mode cam, a mode sleeve operatively attached to the shift fork and axially slideable on the first output shaft, a spring interposed between the shift fork and the mode sleeve constructed and arranged to bias the mode sleeve so that when the vehicle returns to the two-wheel drive mode, the spring applies a force to the mode sleeve to push the mode sleeve back axially toward the dual drive gear.

7. The transfer case of claim 6 wherein the transfer case further comprises a synchronizer wherein the synchronizer includes an outer cone synchronizer comprising an engagement ring axially adjacent to a sprocket, wherein the engagement ring is constructed and arranged to move axially toward the sprocket when the shift fork is moved axially toward the sprocket from rotation of the second cam so that the synchronizer rotates the sprocket to a speed of the first output shaft.

8. A transfer case comprising:
an input shaft having a primary axis of rotation;
a first output shaft which is concentric with the input shaft;
a second output shaft radially offset from the first output shaft;
a range shifter comprising a first cam, a first shift fork, wherein the first shift fork is driven axially by the first cam, and a first sleeve which is axially driven by the first shift fork;
a mode shifter comprising a second cam, a second shift fork, wherein the second shift fork is driven axially by the second cam, and a synchronizer, wherein the synchronizer is actuated by the second shift fork through rotation of the second cam;
a dual drive gear, wherein the dual drive gear is rotated in a forward and a reverse direction to actuate the range shifter and the mode shifter
a gear train operatively connected to the dual drive gear to drive the dual gear drive; and
a reversible electric motor which drives the gear train wherein direction of the rotation of the electric motor determines engagement or disengagement of the mode shifter to selectively shift the vehicle between a two-wheel drive mode and a four-wheel drive mode.

9. The transfer case of claim 8 wherein the range shifter is constructed and arranged to shift a vehicle from a low-range drive mode to a high-range drive mode and the mode shifter is constructed and arranged to shift the vehicle between the two-wheel drive mode and the four-wheel drive mode.

10. The transfer case of claim 8 wherein the dual drive gear further comprises a first actuating tab constructed and arranged to actuate a first tab on the first cam.

11. The transfer case of claim 8 further comprising a spring wherein the spring is interposed between the first cam and the second cam and is constructed and arranged to bias the first cam to follow reversible rotational movement of the dual drive gear and is constructed and arranged to bias the mode sleeve so that when the vehicle returns to the two-wheel drive mode, the spring applies a force to the mode sleeve to push the mode sleeve back axially toward the dual drive gear.

12. The transfer case of claim 8 further comprising at least one sensing element located on a peripheral surface of the dual drive gear for detecting a position of the dual drive gear; and an electronic control unit which actuates the electric motor to actuate the range shifter and the mode shifter in response to the detected position of the dual drive gear by the at least one sensing element.

13. The transfer case of claim 8 wherein the synchronizer further includes an outer cone synchronizer comprising an engagement ring axially adjacent to a sprocket, wherein the engagement ring is constructed and arranged to move axially toward the sprocket when the shift fork is moved axially toward the sprocket from rotation of the second cam so that the synchronizer rotates the sprocket to a speed of the first output shaft.

14. The transfer case of claim 8 further comprising a gear reduction assembly, wherein the first sleeve is engageable between at least one of the range shifter or the mode shifter and the gear reduction assembly to the first output shaft through a splined connection with respect to the first output shaft.

15. The transfer case of claim 14 wherein the gear reduction assembly further includes a planetary gear set comprising a plurality of planetary gears operatively connected to a gear carrier, wherein the plurality of planetary gears rotate within a ring gear and are driven by a sun gear.

16. The transfer case of claim 15 wherein the first cam includes a groove having a low-range portion and a high-range portion, and wherein when the first shift fork is driven to the low-range drive mode portion of the groove, the first sleeve moves axially to couple the first output shaft with the planetary gear carrier and when the first shift fork is driven to the high-range drive mode portion of the groove, the first sleeve moves axially to couple the first output shaft with the sun gear.

17. A method for assembling a transfer case comprising:
providing an input shaft and a first output shaft coaxially on a primary axis of rotation;
providing a second output shaft radially offset from the first output shaft;
providing a power transmission device interposed between the first output shaft and the second output shaft;
providing a range shifter operatively attached to the first output shaft comprising a first cam constructed and arranged for shifting between a low-range drive mode, a high-range drive mode, and a neutral drive mode;
providing a mode shifter for shift-on-the-fly comprising a second cam operatively attached to a synchronizer constructed and arranged for shifting between a two-wheel drive mode and a four-wheel drive mode;
providing a dual drive gear between the range shifter and the mode shifter constructed and arranged so that rotation of the dual drive gear actuates the range shifter and the mode shifter; and
providing a gear train radially off axis from the primary axis constructed and arranged to drive the dual drive gear in a clockwise and counter clockwise direction; and
providing a reversible electric motor which drives the gear train wherein direction of the rotation of the electric motor determines engagement or disengagement of the mode shifter to selectively shift the vehicle between the two-wheel drive mode and the four-wheel drive mode.

18. The method of claim 17 wherein the synchronizer further includes an outer cone synchronizer comprising an engagement ring axially adjacent to a sprocket, wherein the engagement ring is constructed and arranged to move axially toward the sprocket when the shift fork is moved axially toward the sprocket from rotation of the second cam so that the synchronizer rotates the sprocket to a speed of the first output shaft.

19. The method of claim 17 further comprising an electronic control unit operatively connected to the electric motor constructed and arranged for controlling operation of the electric motor.

20. The method of claim 17 further comprising at least one sensing element located on the dual drive gear for detecting a position of the dual drive gear; and an electronic control unit for actuating at least one of the range shifter and the mode shifter in response to the detected position of the dual drive gear by the at least one sensing element.

* * * * *